Jan. 13, 1970  W. R. MALCOLM  3,489,441
SADDLE FITTING FOR CONDUITS
Filed Dec. 14, 1967
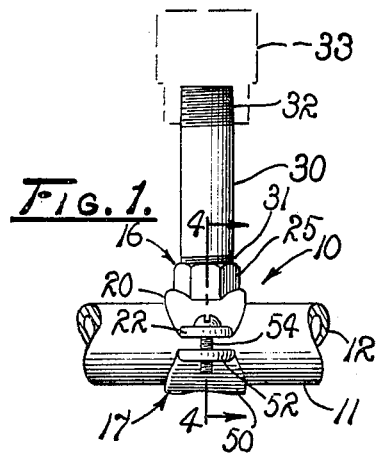
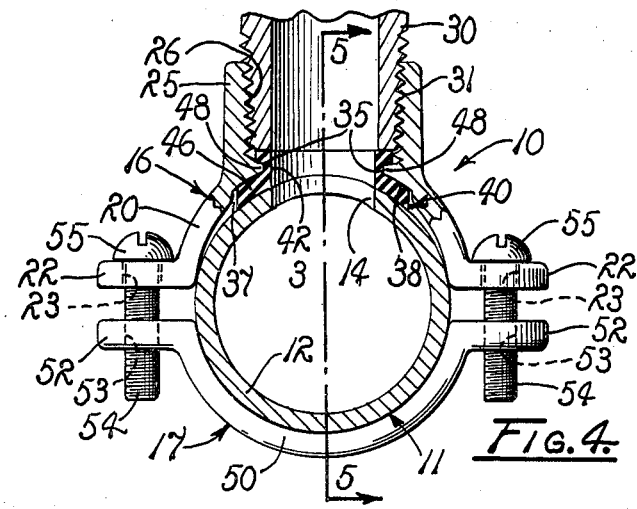
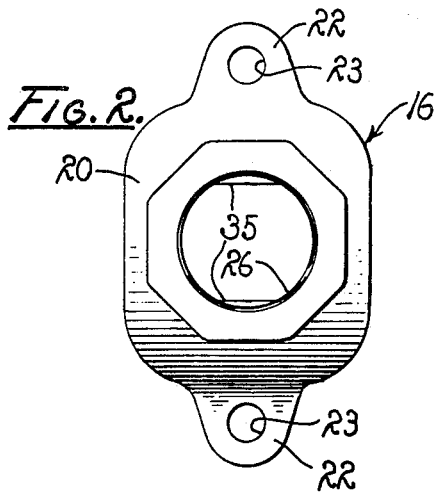
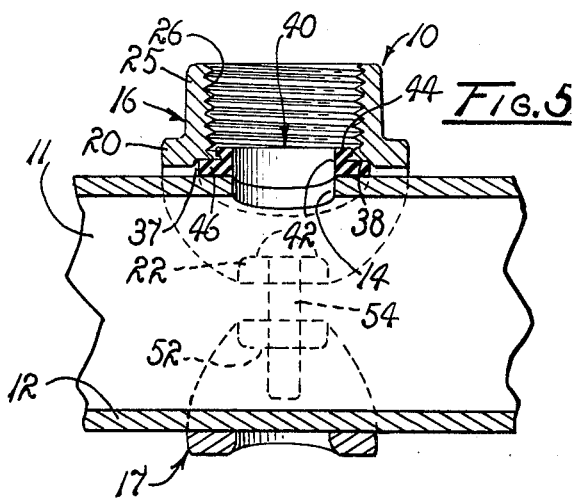
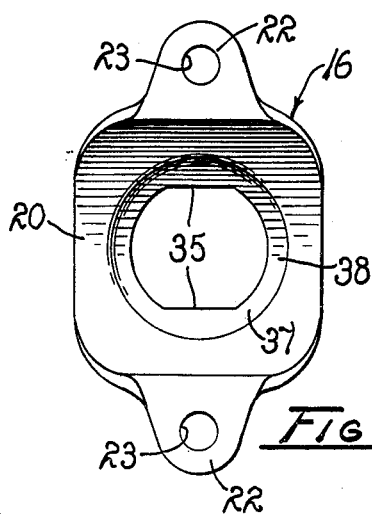
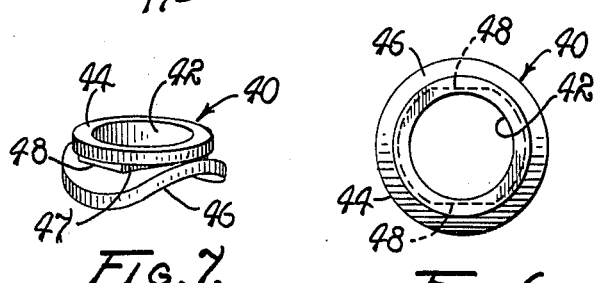
WILLIAM R. MALCOLM
INVENTOR
Huebner & Worrel
ATTORNEYS United States Patent Office 3,489,441
Patented Jan. 13, 1970

3,489,441
SADDLE FITTING FOR CONDUITS
William R. Malcolm, Fresno, Calif., assignor to Buckner Industries, Inc., a corporation of California
Filed Dec. 14, 1967, Ser. No. 690,602
Int. Cl. F16l 5/00, 41/00
U.S. Cl. 285—197                                   1 Claim

ABSTRACT OF THE DISCLOSURE

A saddle fitting for conduits having a head segment and a clamping segment interconnectable about a conduit with the head segment disposed in superimposed relation to an opening in the conduit and including washer indexing and retaining means in the head segment to position and to hold a sealing washer in tightly compressed sealing relation against the conduit in circumscribing relation to the opening.

BACKGROUND OF THE INVENTION

Saddle fittings are customarily employed in conduits when it is desired to have a laterally extended outlet fitting intermediate the ends of such a conduit. In order to install such a saddle fitting, it is only necessary to form an opening in the wall of the conduit and to clamp the fitting in super-imposed relation to the opening. This obviates the necessity of severing the conduit and securing the severed ends to a conventional tee fitting by a tedious and time-consuming heating or bonding process when plastic pipe is used or by threading the severed ends when metal pipe is used.

It is frequently desirable to provide such lateral outlet fittings or risers from conduits, particularly those used in irrigation systems, in order to provide additional sprinkler heads in existing systems and for more accurate sprinkler head placement in new systems without the usual pre-measuring and assembly of the conduits and sprinkler head risers prior to installation of the conduit into the ground. The conventional saddle fittings usually provide arcuately interconnectable head and clamping segments with the head segments providing outwardly extended threaded connectors having fluid passages therethrough on which to mount sprinkler head risers in aligned relation to openings in the wall of the conduit. The openings in the conduit are usually formed in any convenient manner such as by burning, sawing, drilling or the like. A rectangular substantially flat sealing washer of resiliently compressible material is secured to the underside of the head segment by a suitable adhesive material in circumscribing relation to the passage through the connector of the head segment and to the opening in the conduit after installation. Usually, however, the washer is somewhat tapered toward its opposite side edges in order more readily to conform to the underside of the head segment and to the outer periphery of the conduit. In view of the relatively thin cross section of the washer, it is difficult to determine its correct position before gluing. If glued to the head segment so that after installation on the conduit its side edges are disposed in longitudinally spaced relation along the conduit rather than circumferentially thereof, ordinary fluid pressure within the conduit will cause undesirable leakage of fluid outwardly of the fitting between the washer and the head segment. Even when the washer is correctly positioned on the head segment, its sealing effectiveness is dependent upon the clamping force imposed between the head segment and the conduit by the clamping segment. Even when such clamping force is maintained, leakage still frequently occurs when excessive pressures develop within the conduit. Any excessive pressure within the conduit causes fluid to be blown outwardly through the adhesive joint between the head segment and the washer and sometimes for the washer to be extruded from its desired position.

SUMMARY OF THE INVENTION

Accordingly, it is an object of the present invention to provide an improved saddle fitting for conduits.

Another object is to provide such an improved saddle fitting which obviates the necessity for gluing or bonding a seal washer into the head segment of the fitting.

Another object is to provide an improved saddle fitting of the character described which includes washer indexing means accurately to position and releasably to constrain the seal washer within the head segment.

Another object is to provide an improved saddle fitting which dependably maintains its optimum shape during compression of the washer against the conduit in tightly sealing relation.

Another object is to provide an improved saddle fitting which substantially eliminates seal blow-out upon the occurrence of excessive internal pressures.

Other objects and advantages of the present invention will subsequently become more clearly apparent upon reference to the following description and accompanying drawings.

BRIEF DESCRIPTION OF THE DRAWING

FIG. 1 is a side elevation of a saddle fitting embodying the principles of the present invention shown mounted in operating position on a conduit.

FIG. 2 is a top plan view of the head segment of the saddle fitting of the present invention removed from the conduit.

FIG. 3 is a bottom plan view of the heal segment of FIG. 2.

FIG. 4 is a somewhat enlarged transverse vertical section through the saddle fitting and conduit, taken on line 4—4 of FIG. 1.

FIG. 5 is a somewhat enlarged longitudinal vertical section through the saddle fitting and conduit, taken generally along the line 5—5 of FIG. 4.

FIG. 6 is a top plan view of a sealing washer removed from the head segment of the saddle fitting.

FIG. 7 is a perspective view of the sealing washer.

DESCRIPTION OF THE PREFERRED EMBODIMENT

Referring more particularly to the drawing, a saddle fitting embodying the principles of the present invention is generally indicated by the reference numeral 10 and is shown in FIG. 1 mounted on an elongated conduit 11. The conduit is of the type usually employed in underground irrigation systems and may be formed of a suitable plastic or metal material. The conduit provides a tubular wall 12 through which is formed a circular opening 14 as by burning, sawing, drilling, or the like.

The saddle fitting 10 of the present invention includes opposite head and clamping segments, respectively, generally indicated by the reference numerals 16 and 17, respectively, which are disposed in interconnected circumscribing embracing relation on the conduit 11. The head segment 16 provides an arcuate saddle portion 20 which is curved in substantially conforming relation to the curvature of the outer periphery of the conduit 11. The saddle portion has a pair of substantially diametrically opposed ears 22 individually providing a bore 23 therethrough.

The saddle portion 20 of the head segment 16 further includes a connector portion 25 outwardly extended from the saddle portion 20. The connector portion has an internally threaded passage 26 which extends through the saddle portion of the head segment. The connector portion provides a multisided octagon shaped outer periphery for receiving a suitable wrench during installation. A riser pipe 30 having a lower end 31 is shown in FIG. 1 screw-threadably received within the passage 26. The riser pipe includes an opposite upper screw-threaded end 32 for mounting any suitable fluid distributing or sprinkler head indicated in the dashed lines by the reference numeral 33.

The head segment 16 of the saddle fitting 10 further provides a pair of seal washer indexing and constraining ledges 35 within the passage 26 between the connector portion 25 and the saddle portion 20. The ledges are disposed within the passage in diametrically spaced substantially parallel relation and are extended longitudinally of the axis of the saddle portion of the fitting. As best shown in FIG. 3, a circular shallow recess 37 is formed in the underside of the head segment 16 in substantially concentric circumscribing relation to the passage 26 to provide an annular washer confining shoulder 38.

A sealing washer 40 of any suitable resiliently compressible material is adapted to be mounted in the head segment 16 of the saddle fitting 10 prior to their installation on the conduit 11. The seal washer provides a circular bore 42 therethrough which is of a diameter slightly larger than the diameter of the opening 14 through the wall 12 of the conduit. The washer has a sealing ring portion 44 of a diameter snugly to be received within the threaded passage 26 of the head segment and an opposite saddle portion 46 pre-formed in correspondingly arcuate relation to the curvature of the saddle portion 20 of the head segment. The washer includes a neck portion 47 intermediate the ring and saddle portions which is of a diameter somewhat less than the diameter of the ring portion. A pair of diametrically opposite flats 48 are formed in the neck portion 47 which, as best shown in FIG. 4, are adapted intimately to receive and to engage the ledges 35 of the head segment.

The head segment 16 and the seal washer 40 are dependably held in the desired position on the conduit 11 by the clamping segment 17. The clamping segment provides a central arcuate portion 50 curved in correspondingly intimately embracing relation to the conduit and has a pair of diametrically oppositely outwardly extended ears 52. The ears individually provide screw-threaded bores 53 for individually screw-threadably receiving tightening screws 54 having slotted heads 55 tightenable against the ears 22 of the saddle portion 20 of the head segment 16.

OPERATION

The operation of the described embodiment of the subject invention is believed to be clearly apparent and is briefly summarized at this point. As previously described, the opening 14 is formed through the wall 12 of the conduit 11 in any desired manner such as by burning, sawing, drilling, or the like, depending upon the composition of the conduit. The seal washer 40 is quickly and conveniently installed within the head segment 16 by inserting the ring portion 44 thereof into the threaded passage 26. This is accomplished by temporarily deforming the ring portion so as easily to slide passed the ledges 35 in the passage after which the inherent resiliency of the washer forces the ring portion to reassume its true circular configuration within the passage. During such installation, the flats 48 on the neck portion 47 of the washer are aligned in substantially parallel relation with the ledges 35 so that the washer is snapped into place with the ledges intimately engaging the flats. This automatically indexes the washer into proper non-rotatable position with the saddle portion 46 thereof accurately conforming to the curvature of the saddle portion 20 of the head segment 16. It is further noted that the saddle portion 46 of the washer is received within the recess 37. The thickness of the saddle portion of the washer is greater than the depth of the recess so that the washer is partially extended outwardly from the saddle portion of the head segment. This insures that the washer is properly compressed prior to engagement of the head segment with the conduit.

The head segment 16 is then positioned on the conduit 11 with the bore 42 of the seal washer disposed in aligned circumscribing relation to the opening 14 in the conduit. The clamping segment 17 is positioned beneath the conduit and the tightening screws 54 extended through the bores 23 in the ears 22 and screw-threadably tightened into the threaded bores 53 of the ears 52 on the clamping segment. During such tightening operation, the head segment 16 is drawn toward the conduit to compress the saddle portion 46 of the washer 40 into tightly sealing engagement with the conduit. The circular configuration of the saddle portion of the washer is accurately maintained and spreading of the washer is precluded by the shoulder 38 of the recess 37. The riser pipe 30 may then be installed within the threaded passage 26 of the connector portion 25 of the head segment with the lower end 31 of the pipe sealably compressibly engaging the ring portion 44 of the washer within the passage. Upon pressurization of the interior of the conduit by the introduction of fluid therethrough, such fluid is permitted to be laterally discharged from the conduit through the opening 14 of the passage 26, the bore 42 in the washer and the riser pipe 30. Such fluid pressure is exerted against the inner periphery of the bore 42 and radially outwardly therefrom continually to force the washer into more tightly sealing engagement with the conduit and with the head segment 16. This substantially eliminates any possibility of such pressure blowing out through the seal washer, as frequently occurred with conventional saddle fitting seals.

In view of the foregoing, it is readily apparent that the structure of the present invention provides an improved saddle fitting having a seal washer which can be readily snapped into place and accurately constrained in proper sealing relation with the head segment of the fitting without gluing. Furthermore, the washer provides a dual seal between the head segment of the saddle fitting and the conduit and can provide a seal between the head segment and the sprinkler head riser pipe which substantially eliminates any possibility of leakage or loss of internal fluid pressure through the seal.

Although the invention has been herein shown and described in what is conceived to be the most practical and preferred embodiment, it is recognized that departures may be made therefrom within the scope of the invention, which is not to be limited to the details disclosed herein but is to embrace any and all equivalent devices and apparatus.

Having described my invention, what I claim as new and desire to secure by Letters Patent is:

1. A saddle fitting for conduits having a tubular wall providing at least one lateral opening therethrough; comprising a head segment having an arcuate saddle portion substantially conforming to the conduit, and a connector portion outwardly extended from the saddle portion providing a screw-threaded passage extended through said saddle portion; a screw-threaded riser pipe screw-threadably mounted in said passage having a lower annular end, an arcuate clamping segment releasably securing said head segment on the conduit with the passage disposed in aligned relation to said opening in the wall of the conduit, said head segment including a pair of diametrically spaced substantially parallel ledges extended into said passage; and a washer of resiliently compressible material having an arcuate saddle portion of a somewhat larger diameter than the diameter of the opening substantially conforming to the curvature of the conduit and the saddle portion of the head segment and being held in tightly compressed relation therebetween by said clamping segment, an integral seal ring portion deformably extendible into said passage passed said ledges, and a neck portion intermediate said ring and saddle portions having a pair of diametrically opposed substantially parallel flats formed therein indexibly to receive said ledges in intimate nonrotating locking engagement, said lower end of the riser pipe sealably engaging said seal ring portion of the washer to provide a compressive force against said saddle portion thereof more tightly to maintain the same in sealing engagement with the conduit.

References Cited

UNITED STATES PATENTS

| | | | |
|---|---|---|---|
| 2,146,336 | 2/1939 | Frey | 285—197 X |
| 2,949,276 | 8/1960 | Merritt et al. | 251—146 |
| 2,987,294 | 6/1961 | Merritt et al. | 251—146 |
| 3,009,655 | 11/1961 | Palmer | 285—197 X |
| 3,258,822 | 7/1966 | Schlesch et al. | 285—197 X |
| 3,362,730 | 1/1968 | St. Clair et al. | 285—197 X |

DAVID J. WILLIAMOWSKY, Primary Examiner

WAYNE L. SHEDD, Assistant Examiner

U.S. Cl. X.R.

285—379